(12) United States Patent
Schuren et al.

(10) Patent No.: US 6,926,954 B2
(45) Date of Patent: Aug. 9, 2005

(54) DECORATIVE SHEET OR MOLDING COMPRISING FIBERS AND FILLERS AND PROCESS FOR ITS PRODUCTION

(75) Inventors: Geer Schuren, Heel (NL); Chris Van Der Vorst, Posterholt (NL)

(73) Assignee: Trespa International B.V., Weert (NL)

( * ) Notice: Subject to any disclaimer, the term of this patent is extended or adjusted under 35 U.S.C. 154(b) by 168 days.

(21) Appl. No.: 10/072,253

(22) Filed: Feb. 8, 2002

(65) Prior Publication Data

US 2002/0155297 A1 Oct. 24, 2002

(30) Foreign Application Priority Data

Feb. 14, 2001 (DE) ......................... 101 06 762

(51) Int. Cl.⁷ ........................... B32B 5/16; B32B 21/02
(52) U.S. Cl. .................. 428/292.4; 52/309.15; 428/297.7; 428/324; 428/326; 428/329; 428/330
(58) Field of Search .................. 428/106, 113, 428/292.4, 297.7, 324, 326, 329, 330, 323, 327; 52/309.15

(56) References Cited

U.S. PATENT DOCUMENTS

| | | | |
|---|---|---|---|
| 3,673,020 A | | 6/1972 | De Jaeger |
| 4,228,116 A | * | 10/1980 | Colombo et al. ........... 264/119 |
| 4,251,576 A | * | 2/1981 | Osborn et al. .............. 428/331 |
| 4,379,194 A | * | 4/1983 | Clarke et al. ................ 428/203 |
| 4,826,901 A | * | 5/1989 | Ittmann et al. ............. 524/145 |
| 5,502,088 A | | 3/1996 | Hododi ........................ 524/34 |
| 6,387,489 B2 | * | 5/2002 | Willemse et al. ........... 428/359 |
| 6,682,814 B2 | * | 1/2004 | Hendrickson et al. ...... 428/326 |

FOREIGN PATENT DOCUMENTS

| | | | |
|---|---|---|---|
| DE | 2 315 145 A | 10/1974 | .............. B29J/5/00 |
| EP | 0 029 335 A1 | 5/1981 | .............. B29J/5/00 |
| EP | 0 081 147 B1 | 6/1983 | .......... C08L/97/02 |
| FR | 1 470 329 A | 2/1967 | |
| FR | 2 117 512 | 7/1972 | .............. B29J/5/00 |
| JP | 03 087250 | 4/1991 | .......... B32B/21/08 |

* cited by examiner

*Primary Examiner*—H. Thi. Le
(74) *Attorney, Agent, or Firm*—ProPat, L.L.C.

(57) ABSTRACT

A decorative sheet or a molding, in particular suitable for indoor or outdoor applications on buildings, is in each case composed of a single- or multi-layer core, monolaterally or bilaterally laminated with decorative layer(s) The core layer (s) comprise(s) wood fibers, cellulose fibers, or timber sawdust products and also an organic or inorganic filler material, and a hot-curing resin. The particle size of the filler material is smaller than the thickness of the fibers or of the timber sawdust products in the core layer(s). These core layer(s) are composed of from 15 to 80% by weight of fibers or of timber sawdust products, from 10 to 75% by weight of filler material, and from 10 to 50% by weight of resin, based in each case on the total weight of the core layer(s).

12 Claims, 1 Drawing Sheet

DECORATIVE SHEET OR MOLDING COMPRISING FIBERS AND FILLERS AND PROCESS FOR ITS PRODUCTION

BACKGROUND OF THE INVENTION

1. Field of the Invention

The invention relates to a decorative sheet and/or a molding, in particular for indoor or outdoor applications on buildings, made from a monolaterally or bilaterally decorative-layer-laminated, pressed single- or multilap core layer made from wood fibers and/or from cellulose fibers, or from timber sawdust products, where the fibers or the timber sawdust products have been impregnated with a resin as binder and are surrounded by the hot-curing binder, and also to its use, and to a process for producing a sheet of this type.

2. Description of the Prior Art

The prior art discloses sheets made from woodchips and from wood fibers with a matrix of amino plastic or of phenolic resins or cement, and also discloses plywood sheets, where these have uniform density and are suitable for external applications or internal applications in damp conditions. However, unlike high-pressure laminate sheets, sheets of this type are not maintenance-free, and they generally require post-treatment on all sides due to severe water absorption through the nonsealed surface. Water absorption can cause severe swelling, with an increase in sheet thickness. Sheets of this type have low strength and are not decorative. The core is usually composed of solid sheets of soda kraft paper and of a phenolic resin, without a decorative layer, or with a decorative layer on one or both surfaces of the core. Hot-curing resins are cured at high pressure and high temperature, and together with the sodium kraft paper form a solid homogeneous, integrated sheet. Sheets of this type are termed HPL sheets or high-pressure laminate sheets.

U.S. Pat. No. 3,673,020 (DE-A 19 12 300) describes a decorative sheet molding made from sawdust and comprising a matrix of phenolic resin, the resin content being from 5 to 15% by weight, based on the dry weight of the sawdust. The weathering resistance of this molding is unsatisfactory. In weathering tests there is marked absorption of water with associated edge swelling and splitting of the pressed core, causing surface cracking after just a few weeks.

EP-B 0 081 147 (U.S. Pat. No. 4,503,115) discloses a decorative panel composed of a pressed core made from wood particles surrounded by hot-curing phenol-formaldehyde resin. On one or both surfaces of the core of the panel there are decorative layers composed of a woven or nonwoven fabric or cloth or of a plastics film or paper foil or wood foil, and/or of a coating layer. The wood fibers and/or cellulose fibers of the core have a maximum length of 20 mm, and the wood fibers here have been coated with the hot-curing phenol-formaldehyde resin in aqueous solution or dispersion. The resin content is more than 150 g per 1 000 g of dry fibers, and extends to 900 g. The water content of the wood fibers is of the order of from 3 to 10% by weight, and the density of the panel is from 1 100 to 1 500 $kg/m^3$. In particular, the decorative layer is composed of a melamine-formaldehyde-resin-saturated decorative film whose weight per unit area is from 80 to 400 $g/m^3$. Where appropriate, the decorative layer comprises a filler and/or a dye. If the surface of the pressed core is decorated by coating with a crosslinked acrylic, urethane, epoxy, or melamine resin, this coating comprises, where appropriate, a filler and/or a dye.

The manner of producing this decorative panel is that one or more mechanically precompacted layers based on wood fibers and laid one on top of the other are hot-press-molded to give the core, whereupon the hot-curing phenol-formaldehyde resin of the precompacted layers cures. One or both surfaces of the core are equipped with a decorative layer, which is either applied to the precompacted mat made from a number of layers, or is applied to the core once it has been produced by press-molding this mat.

This known panel has very uniform dimensional stability in longitudinal and transverse directions and is highly dimensionally stable even when exposed to severe weathering cycles. When comparison is made with other known sheets made from wood particles and from wood fibers or cellulose fibers, this panel has higher flexural strength and higher tensile and transverse strength, higher dimensional stability, and reduced water absorption. This panel is a laminate made from pre-press-molded wood-fiber-resin layers and decorative layers, and its perceived color remains unchanged over long periods, since it has weathering-resistant decorative layers serving as protective covering for the surfaces of the core.

The resin in HPL sheets has a twin function, which consists firstly in binding the wood fibers and/or cellulose fibers and secondly in filling the space between the fibers. Known solid sheets or HPL sheets use precondensed phenolic resins for binding the fibers and for filling the space between the fibers.

It is an object of the invention to improve a sheet of the type described at the outset in such a way that various physical properties can be achieved, and in particular moisture repellency is improved, without any excessive sacrifice of the sheet's mechanical properties.

SUMMARY OF THE INVENTION

The invention achieves this object by means of the sheet described at the outset, by using a core layer which comprises a filler material whose particle size is smaller than the thickness of the fibers or of the timber sawdust products.

DETAILED DESCRIPTION OF THE PREFERRED EMBODIMENT

Figure 1:
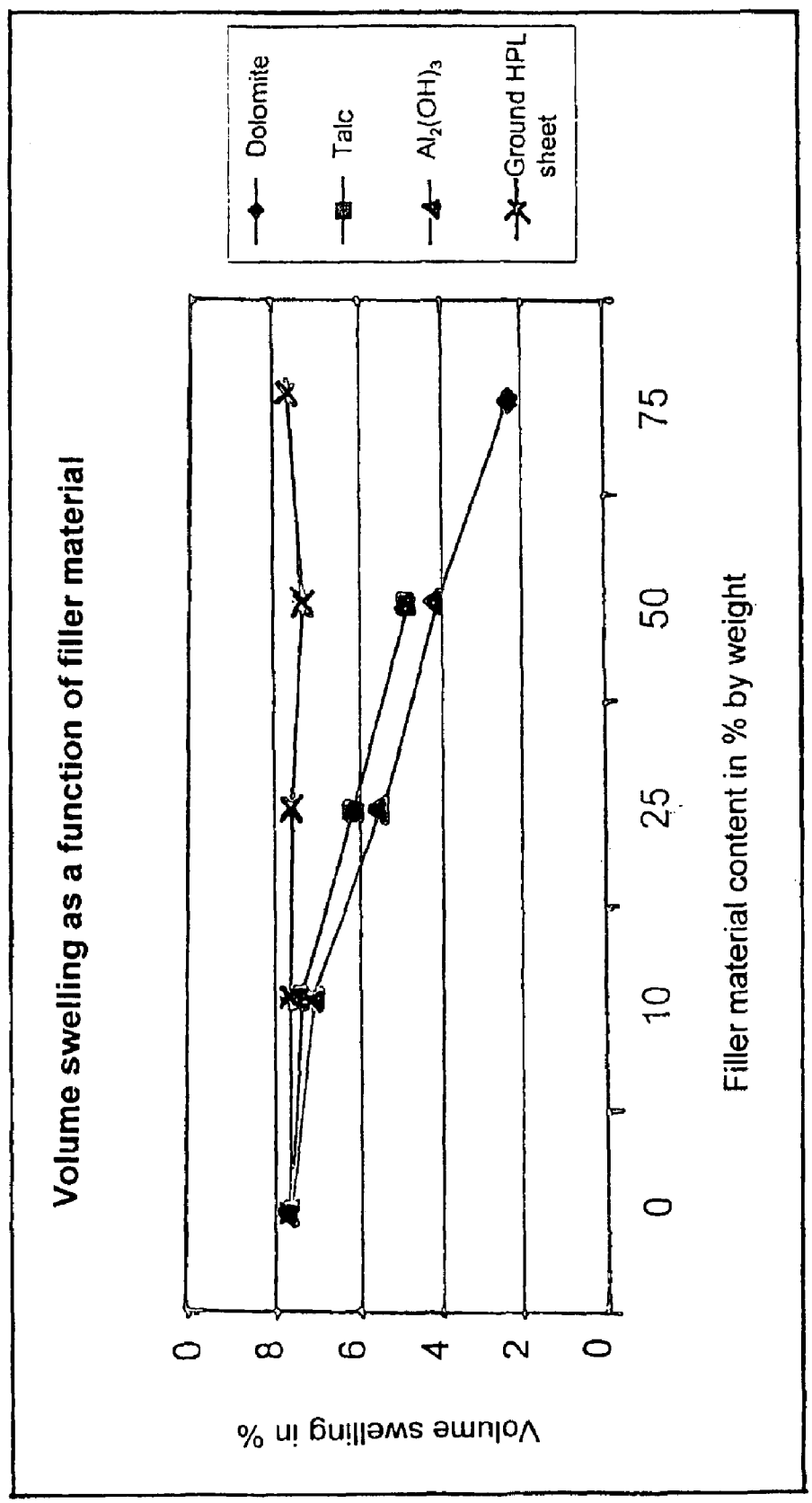
FIG. 1 shows a plot of volume swelling of different materials plotted against filler material content in % by weight.

In one embodiment of the invention, the core layer is composed of from 15 to 80% by weight of fibers or of timber sawdust products, from 10 to 75% by weight of filler material, and from 10 to 50% by weight of resin, based in each case on the total weight of the core layer. The core layer preferably encompasses from 25 to 75% by weight of fibers or of timber sawdust products, from 20 to 50% by weight of filler material, and from 15 to 30% by weight of resin, based in each case on the total weight of the core layer. It is advantageous for the filler material to be thermally stable up to 200° C., to be neither hydrolyzable nor hygroscopic, and to consist of inorganic or organic material.

The timber sawdust products usually obtainable in the market are timber sawdust, fibrous timber sawdust, pellets produced from timber sawdust, and similar products.

In one embodiment of the invention, the particle size of the filler is in the range from 1 to 250 $\mu$m, in particular from 5 to 50 $\mu$m, while the wood fibers and/or cellulose fibers have a length of from 0.3 to 30 mm, an average length from 0.5 to 3 mm, and an average diameter of from 10 to 500 µm.

In one embodiment of the invention, the filler material may be selected from a group of inorganic materials encompassing, inter alia, talc, chalk, dolomite, aluminum hydroxide, magnesium hydroxide, barium sulfate, perlite diatomite, mica, calcium carbonate, and mixtures of these. It is advantageous for the filler material to be composed of organic materials, such as ground residues of high pressure laminate ("HPL") sheets, sawdust produced from HPL sheets when the sheets are cut, and/or ground used HPL sheets, or of timber sawdust products, or of wood fibers and/or cellulose fibers.

Sheets of this type are used for the external cladding of buildings in the form of a curtain facade, of a panel screening a wall or roof, or of cladding for a balcony, or of a parapet panel or apron panel, or else for the internal lining, or internal applications for walls or furniture, or for wet-rooms or laboratory equipment, or for similar areas.

According to the invention, the process for producing a sheet in which one or more mechanically precompacted laps made from cellulose fibers and/or wood fibers or from timber sawdust products, enclosed by a hot-curing resin, having been placed one upon the other, are press-molded to one another and to one or more decorative layer(s) in contact with one or both surfaces of the combined laps, using heat, where the resin is cured, comprises, prior to the precompaction of the lap(s) in a first step mixing filler material with the fibers or timber sawdust products or with the resin, and comprises, in a second step, admixing resin and/or fibers or timber sawdust products.

The production of the wood fibers for the laps which are press-molded to give the core is described in detail in EP-B 0 081 147, the disclosure of which is incorporated into the present description by way of reference. The core layer is composed of one or more laps made from wood fibers and/or from cellulose fibers, the content of the fibers being from 15 to 80% by weight, preferably from 25 to 75% by weight, based on the total weight of the core layer. The core layer is generally produced by combining from one to three laps. From at least 10% by weight to a maximum of 75% by weight of a filler material, based on the total weight of the core layer, is added to the wood fibers and/or cellulose fibers. The range from 20 to 50% by weight is preferred for the filler material. Another component of the core layer is a resin for coating of the wood fibers and/or of the cellulose fibers, and also of the filler material. This resin is preferably a phenol-formaldehyde resin, but use may also be made of other resin systems, e.g. a melamine resin or an epoxy resin. The resin content is generally from 10 to 50% by weight, based on the total weight of the core layer, and preference is given to a content of from 15 to 35% by weight. There are various ways of introducing the filler material, and there is a variety of possible mixing sequences here:

The fibers and the filler material are mixed with one another in a first step, and the resin is added to the mixture in a second step.

The fibers and the resin are mixed with one another in a first step, and the filler material is added to the mixture in a second step.

The filler material and the resin are mixed with one another in a first step, and the fibers are added to the mixture in a second step.

Before the wood fibers and/or cellulose fibers are mixed with the other constituents, they may be subjected to a chemical reaction with formaldehyde, for example by means of treatment with vapor at from 3 to 10 bar and at a temperature of from 80 to 180° C. While still moist, or after drying, the resultant wood fibers and/or cellulose fibers are mixed with the filler material and with the resin. Phenol-formaldehyde resins particularly suitable for this purpose are described in EP-B 0 081 147, as are known flame retardants which are added to the resin. The mixture made from fibers, filler material, and resin is dried with hot air, for example, to a residual moisture level of from 0.5 to 10% by weight, preferably from 1.5 to 2.5% by weight, whereupon the resin partially cures.

After the drying, the mixture is stored or passed directly to scattering equipment. The mixture is continuously and uniformly deposited to give a scattered layer on a horizontal conveyor belt in such a way that there is distribution over the entire width, giving a mat similar to a nonwoven fabric, and the mat is preformed to give a prepreg. One or more of these prepregs are mono- or bilaterally combined with a decorative layer, and press-molded at a high pressure of from 65 to 100 bar, at a temperature of from 120 to 200° C., in particular 150° C., to give a decorative sheet. Curing of the resin during the pressing process produces a uniform, crosslinked layer made from wood fibers and/or from cellulose fibers and filler material.

The fiber material used is mainly raw wood fibers, but use may also be made of chemically treated, heat-treated, moisture-treated, or microbiologically treated wood fibers. Instead of fiber material it is also possible to use timber sawdust products, which, compared with fiber material, generally cause a small reduction in the level of the properties of the sheet. Softwoods and hardwoods are suitable for producing fibers, for example by softening wood chippings with steam in a boiler at a pressure of from 1 to 10 bar, and then comminuting these to give fibers of length from 0.3 to 30 mm and average length from 0.5 to 3 mm and average diameter of from 0.010 to 0.5 mm. If cellulose fibers are used, their lengths and diameters are approximately in the ranges for the wood fibers. Timber sawdust products are available in the market in the form of fine material, fibrous fine material, and pellets, and may likewise be used for producing the core layers of a sheet. The preferred particle size is smaller than 500 µm, and the length/diameter ratio for the fiber material in the mixtures made from wood fibers, cellulose fibers, fine material, or pellets is preferably greater than 10.

The resins used comprise hot-curing resins, such as phenol-formaldehyde resin, melamine-epoxy resin, resins having urea units, resins having isocyanate units, and mixtures of resins of this type. A pure or modifying novolak or a resol grade is preferably used for the core layer of the sheet.

The filler materials used comprise conventional inorganic filler materials and organic filler materials, such as ground residues of HPL material. The particle size of the filler material is significant for its use. This size has to be smaller than the thickness of the fibers or of the timber sawdust products. The particle size distribution of the inorganic filler materials is generally from 1 to 50 µm, the average of the distribution being in the range from 5 to 10 µm. For ground residues of HPL material and ground hot-curing resin, the particle size distribution is generally in the range from 1 to 250 µm, preferably with an average in the range from 20 to 50 µm The filler materials used have to be compatible with the resin and with the fibers, and must not have more than a limited effect on the curing of the resin. The filler materials are moreover neither hygroscopic nor hydrolyzable, and are also thermally stable up to temperatures of 200° C.

Examples of inorganic fillers which may be used are talc, chalk, dolomite, aluminum hydroxide, magnesium hydroxide, barium sulfate, pearlite, diatomite, mica, calcium carbonate, and mixtures of these. This list of inorganic filler materials is given by way of example and is certainly not comprehensive. Inorganic materials whose properties are comparable to those of the filler materials listed are likewise suitable as filler materials of the invention. Organic filler material is provided by ground HPL residues, which give a fine material which is also produced when HPL sheets are machined, or by small remnants of HPL sheets remaining after the cutting or finishing of the sheets to the sizes specified, or by complete recycled HPL sheets which are ground.

In standard boards or standard HPL sheets without filler material, the binder has a twin function, namely firstly to bind the fibers and secondly to fill the space between the fibers during the press-molding of the sheet. Surprisingly, it has been found that the addition of filler material to the mixture made from fibers and resin causes no reduction in the essential properties of the sheets. One possible explanation for this phenomenon is that the filler material acts to fill out the space between the fibers during the continuous compression procedure. This means that the properties of the sheet can be held at a high level using less binder than for a sheet without filler material. The use of less resin therefore favors the retention of a high level of mechanical and physical properties in the sheets.

The physical properties of the sheet of the invention may be influenced by changing the types of filler material and by changing the content of the filler material in the mixture made from resin, fibers, and filler material. The invention solves the problem of using a selected composition of the starting materials to obtain sheets with improved moisture properties, such as lower water absorption and lower volume swelling, with almost unchanged mechanical properties. The type of filler material and the content of the filler material influence other properties, such as fire performance, core layer color, density, durability, sound absorption, reduction in the amount of smoke and toxic gases in the event of a fire, and reduction of permeability to radiation (such as X-rays).

Replacement of some of the resin-saturated fibers by the filler material reduces the swelling behavior of the hot-curing sheet almost linearly with the content of filler material. In addition, the curing behavior of the resin also influences the hygroscopic properties of the sheet. The selection of the type of filler material and its content in the fiber-resin composition are optimized in such a way as to achieve the same level of resin curing as that in a standard board. Different press-molding conditions may be used for different types of filler material, depending on the effect which the type of filler material has on the curing of the resin. Surprisingly, the mechanical properties of the sheet have been found to be only very slightly influenced at a content of up to 50% of filler material by weight. Higher contents of the filler material by weight increase brittleness, and this is seen in a lower flexural strength value.

Flame-retardancy is increased by lowering the content of organic filler in the sheet and by using specific inorganic filler materials with flame-retardant properties, for example aluminum hydroxide and magnesium hydroxide. This is seen in a lower value for heat generated per $m^2$ when comparison is made with a standard board. The use of specific filler materials likewise reduces the amount of smoke and toxic gases in the event of a fire. Sheets with high content of white filler material have a pale-colored core which is relatively resistant to weathering. Addition of dyes during sheet production where the content of white filler material used is high permits production of decorative sheets which have a colored core and which can be used without a surface decorative layer, and whose core color and surface color are identical.

Addition of high-density filler material raises the density of the sheet. Sheets of this type with high density have improved sound-absorption properties. The use of specific types of filler material, for example of lead and lead components, attenuate radiation (for example X-rays). Sheets produced with inorganic filler material or with ground organic HPL residue material have a lower level of service life properties. The reason for this is the partial replacement of materials with high service life, namely resin and fibers, by a material with low service life.

The invention is illustrated in further detail below, using examples. It will be appreciated that variations in proportions and alternatives in elements of the components of the invention will be apparent to those skilled in the art and are within the scope of the present invention.

EXAMPLES

Example 1

Flame Retardancy Test (Cone Calorie Test):

This test used the method of ISO 5660, and further details of the test are given in the U.S. patent application Ser. No. 09/878,254, filed Jun. 11, 2001 (00/101TRE). The description of this test in this U.S. patent application is fully incorporated into the present application.

Example 2

Volume Swelling

The volume swelling given in the examples is determined as follows:

Volume swelling is defined as the dimensional change of a specimen in terms of length, width and thickness after weathering for 3 600 h at 40° C. and 100% relative humidity. Volume swelling is calculated from the formula:

$$((length \times width \times thickness\ after\ weathering)/(length \times width \times thickness\ prior\ to\ weathering)) \times 100\%$$

The patent applicant's internal test is used to determine the volume swelling of a specimen. For the other test methods given in the examples, the test method used here is stated in each case.

The density of the sheets of the examples is in the range from 1 200 to 1 950 kg per $m^3$, and the thickness is from 2 to 10 mm, in particular from 6 to 9 mm. The content of filler material is in the range from 10 to 75% by weight, the resin content is in the range from 20 to 25% by weight, and the fiber content is in the range from 5 to 65% by weight.

Example 3

A mixture made from a phenolic resin solution and talc (Westmin D 30 E from Mondo Minerals OY, Kasarmikatu, Helsinki (Finland) was mixed with wood fibers and dried to 2% by weight residual moisture. The fibrous material was shaped and pressed to give a prepreg. The prepreg was laminated with a decorative layer on both sides and pressed at a temperature of 150° C. and a pressure of 80 bar until the desired degree of resin curing had been achieved. The compositions of the sheets prepared in this way were as follows:

TABLE 1

| Sheet | A | B | C | Units | Test method |
|---|---|---|---|---|---|
| Filler material: talc | 0 | 25 | 50 | % by wt | |
| Wood fibers | 70 | 55 | 30 | % by wt | |
| Resin | 30 | 20 | 20 | % by wt | |
| Density | 1365 | 1544 | 1788 | kg/m$^3$ | ASTM-D792-91 |
| Thickness | 7.45 | 8.85 | 8.20 | mm | |
| Modulus of elasticity | 10280 | 12616 | 12907 | N/mm$^2$ | DIN 53457 |
| Flexural strength | 160 | 143 | 128 | N/mm$^2$ | ISO 178 |
| Swelling in boiling water | 3.71 | 3.59 | 3.38 | % | EN 438-2 |
| Water absorption in boiling water | 0.72 | 0.61 | 0.51 | % | EN 438-2 |
| Volume swelling | 7.81 | 6.13 | 4.79 | % | Trespa test |
| Flame retardancy test (radiated heat 50 kW/m$^2$) Total heat release after 10 min | 79 | 68 | 57 | MJ/m$^2$ | ISO 5660 |

Example 4

A mixture made from a phenolic resin solution and ground residues of HPL sheets was mixed with wood fibers and dried to 2% by weight moisture content. The fibrous material was shaped and press-molded to give a prepreg. This prepreg was combined with a decorative layer on both sides and press-molded at a temperature of 150° C. and a pressure of 80 bar until the desired degree of resin curing had been achieved, to give a decorative sheet. The compositions prepared for producing the sheets were those given below in table 2:

TABLE 2

| Sheet | D | E | F | G | Units | Test method |
|---|---|---|---|---|---|---|
| Filler material: ground HPL sections | 0 | 25 | 50 | 75 | % by wt | |
| Wood fibers | 70 | 55 | 30 | 5 | % by wt | |
| Resin | 30 | 20 | 20 | 20 | % by wt | |
| Density | 1366 | 1396 | 1369 | 1273 | kg/m$^3$ | ASTM-D792-91 |
| Thickness | 7.09 | 8.00 | 6.33 | 6.72 | mm | |
| Modulus of elasticity | 10413 | 10488 | 9903 | 8912 | N/mm$^2$ | DIN 53457 |
| Flexural strength | 156 | 148 | 130 | 81 | N/mm$^2$ | ISO 178 |
| Swelling in boiling water | 3.61 | 3.82 | 3.55 | 3.43 | % | EN 438-2 |
| Water absorption in boiling water | 0.69 | 0.72 | 0.65 | 0.62 | % | EN 438-2 |
| Volume swelling | 7.72 | 7.54 | 7.36 | 7.63 | % | Trespa test |

Example 5

A mixture made from a phenolic resin solution and dolomite (CaMg(CO$_3$)$_2$: with trade name Microdol 1 from Norwegian Talc A.S. Knarrevik, Norway) was mixed with wood fibers and dried to 2% by weight residual moisture. The fibrous material was shaped and press-molded to give a prepreg. This prepreg was combined with a decorative layer on both sides and press-molded at a temperature of 150° C. and a pressure of 80 bar until the desired degree of resin curing had been achieved. The compositions of the sheets prepared were as in table 3 below:

TABLE 3

| Sheet | H | I | J | K | L | Units | Test method |
|---|---|---|---|---|---|---|---|
| Filler material: dolomite | 0 | 10 | 25 | 50 | 75 | % by wt | |
| Wood fibers | 70 | 65 | 50 | 30 | 5 | % by wt | |
| Resin | 30 | 25 | 25 | 20 | 20 | % by wt | |
| Density | 1405 | 1451 | 1547 | 1757 | 1939 | kg/m$^3$ | ASTM-D792-91 |
| Thickness | 6 | 6 | 6 | 6 | 6 | mm | |
| Modulus of elasticity | 10326 | 10162 | 10831 | 11947 | 10805 | N/mm$^2$ | DIN 53457 |
| Flexural strength | 156 | 155 | 145 | 126 | 71 | N/mm$^2$ | ISO 178 |

TABLE 3-continued

| Sheet | H | I | J | K | L | Units | Test method |
|---|---|---|---|---|---|---|---|
| Swelling in boiling water | 3.86 | 3.62 | 3.19 | 2.56 | 1.17 | % | EN 438-2 |
| Water absorption in boiling water | 0.66 | 0.52 | 0.45 | 0.38 | 0.24 | % | EN 438-2 |
| Volume swelling | 7.60 | 7.18 | 5.59 | 4.09 | 2.26 | % | Trespa test |
| Flame retardancy (radiant heat 50 kW/m$^2$) Total heat release after 10 min | 81 | 70 | 61 | 52 | 45 | MJ/m$^2$ | ISO 5660 |

Example 6

A mixture made from a phenolic resin solution and aluminum hydroxide (Al(OH)$_3$, available with the trade name HN532 from Huber Engineered Minerals) was mixed with wood fibers and dried to 2% by weight residual moisture. The fibrous material was shaped and press-molded to give a preform. This preform was combined with a decorative layer on both sides and press-molded at a temperature of 150° C. and a pressure of 80 bar until the desired degree of resin curing resin had been achieved. The compositions prepared for the sheets were as in table 4 below:

TABLE 4

| Sheet | M | N | Units | Test method |
|---|---|---|---|---|
| Filler material: Al(OH)$_3$ | 0 | 50 | % by wt | |
| Wood fibers | 70 | 30 | % by wt | |
| Resin | 30 | 20 | % by wt | |
| Density | 1365 | 1595 | kg/m$^3$ | ASTM-D792-91 |
| Thickness | 7.45 | 8.29 | mm | |
| Modulus of elasticity | 10280 | 11803 | N/mm$^2$ | DIN 53457 |
| Flexural strength | 158 | 131 | N/mm$^2$ | ISO 178 |
| Swelling in boiling water | 3.65 | 3.32 | % | EN 438-2 |
| Water absorption in boiling water | 0.65 | 0.56 | % | EN 438-2 |
| Volume swelling | 7.92 | 4.21 | % | Trespa test |
| Flame retardancy (radiant heat 50 kW/m$^2$) Total heat release after 10 min | 82 | 23 | MJ/m$^2$ | ISO 5660 |

In the case of the test methods given in tables 1 to 4 in relation to the hygroscopic and mechanical properties of the sheets, use was made of the standard tests given in the tables.

Column 2 of each of tables 1 to 4 lists the sheets without filler material, and the following columns list the sheets with increases in the content of filler material.

Each of the sheets of examples 1, 3, and 4 uses an inorganic filler material in the core layer, and as the content of this filler material in the core layer of the sheets rises the result is higher sheet density, reduction in water absorption, reduction in volume swelling, and lower heat release in the event of a fire involving the sheet compared with sheets without filler material. The flexural strength of the sheets reduces only slightly up to 50% content of the filler material by weight in the core layer of the sheets.

The core layer of the sheets of example 4 comprises an organic filler material made from ground residues of HPL sheets. As the content of the organic filler material in the core layer of the sheets rises, the density of these sheets remains almost constant, the water absorption reduces, but to a lower extent than with inorganic filler material, and the volume swelling remains almost constant. Heat release was not measured for example 4, since it is approximately the same as the heat release from a sheet without filler material as in example 3.

The single figure plots volume swelling as a function of percentage content by weight of the filler material in the core layer of the sheets for the various types of filler material for examples 3 to 6.

What is claimed is:

1. A decorative sheet or a molding for indoor or outdoor applications on buildings made from a monolaterally or bilaterally decorative-layer-laminated, pressed single- or multilap core layer made from wood fibers, cellulose fibers, a mixture of wood fibers and cellulose fibers, or from timber sawdust products, where the fibers or the timber sawdust products have been impregnated with a heat-curing resin as binder and are surrounded by the binder, wherein the core layer comprises a filler material whose particle size is smaller than the thickness of the individual fibers or of the timber sawdust products, wherein the particle size of the filler material is in the range of from 5 to 50 microns.

2. The decorative sheet or the molding as claimed in claim 1, wherein the core layer is composed of from 15 to 80% by weight of fibers or of timber sawdust products, from 10 to 75% by weight of filer material, and from 10 to 50% by weight of resin, based in each case on the total weight of the core layer.

3. The decorative sheet or the molding as claimed in claim 1, wherein the core layer encompasses from 25 to 75% by weight of fibers or of timber sawdust products, from 20 to 50% by weight of filler material, and from 15 to 35% by weight of resin, based in each case on the total weight of the core layer.

4. The decorative sheet or the molding as claimed in claim 1, wherein the filler material is thermally stable up to 200° C. and neither hydrolyzable nor hygroscopic, and is composed of inorganic or organic material.

5. The decorative sheet or the molding as claimed in claim 1, wherein the filer material comprises an inorganic material selected from the group consisting of talc, chalk, dolomite, aluminum hydroxide, magnesium hydroxide, barium sulfate, perlite, diatomite, mica, calcium carbonate, and mixtures of these.

6. The decorative sheet or the molding as claimed in claim 1, wherein the filler material is composed of organic materials, said organic materials comprising at least one member selected from the group consisting of ground residues of high-pressure laminate sheets, sawdust produced from high-pressure laminate sheets when the sheets are cut, ground recycled high-pressure laminate sheets, ground residues of timber sawdust products, wood fibers, and cellulose fibers.

7. The decorative sheet or the molding as claimed in claim 1, wherein the water content of the core layer prior to press-molding to give a prepreg is from 0.5 to 10% by weight, based on the total weight of the core layer.

8. The decorative sheet or the molding as claimed in claim 1, wherein the water absorption of the sheet decreases as the content of the filler material rises, at a resin content of from 20 to 25% by weight.

9. The decorative sheet or the molding as claimed in claim 8, wherein the filler material is an inorganic filler and the volume swelling of the sheet decreases as inorganic filler content rises, at a resin content of from 20 to 25% by weight.

10. The decorative sheet or the molding as claimed in claim 8, wherein the filler material is an organic filler and the volume swelling of the sheet remains almost constant as organic filler content rises, at a resin content of from 20 to 25% by weight.

11. The decorative sheet as claimed in claim 8, wherein the flexural strength of the sheet with up to 50% by weight content of filler material is at most 20% lower than the flexural strength of a sheet in whose core layer no filler material is present.

12. An article comprising the sheet or the molding of claim 1 for external cladding of buildings in the form of a curtain facade, of a panel screening a wall or roof, or of cladding for a balcony, or of a parapet panel or apron panel, or else for the internal lining of walls or furniture, or of wet-rooms or laboratory equipment.

* * * * *